(12) United States Patent
Hsu et al.

(10) Patent No.: US 7,969,721 B2
(45) Date of Patent: Jun. 28, 2011

(54) PORTABLE COMPUTER

(75) Inventors: Su-Ching Hsu, Taipei (TW); Chih-Ho Hsieh, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 35 days.

(21) Appl. No.: 12/479,969

(22) Filed: Jun. 8, 2009

(65) Prior Publication Data

US 2010/0039763 A1 Feb. 18, 2010

(30) Foreign Application Priority Data

Aug. 12, 2008 (TW) .............................. 97130687 A

(51) Int. Cl.
*G06F 1/16* (2006.01)
(52) U.S. Cl. .............. 361/679.26; 348/333.01; 345/175; 16/330
(58) Field of Classification Search ............... 348/222.1, 348/333.01; 361/679.55, 679.26, 679.52, 361/679.27, 679.58; 345/169, 175; 16/341, 16/342, 330, 337
See application file for complete search history.

(56) References Cited

U.S. PATENT DOCUMENTS

| | | | |
|---|---|---|---|
| 6,930,669 B2 | 8/2005 | Weiner et al. | |
| 7,126,816 B2 | 10/2006 | Krah | |
| 7,486,279 B2 * | 2/2009 | Wong et al. | 345/173 |
| 2004/0105226 A1 * | 6/2004 | Geeng | 361/683 |
| 2006/0279652 A1 * | 12/2006 | Yang et al. | 348/333.01 |
| 2009/0189991 A1 * | 7/2009 | Lee | 348/222.1 |
| 2009/0244832 A1 * | 10/2009 | Behar et al. | 361/679.55 |

FOREIGN PATENT DOCUMENTS

CN 1831794 9/2006

OTHER PUBLICATIONS

English language translation of abstract of CN 1831794.

* cited by examiner

*Primary Examiner* — Hung V Duong
(74) *Attorney, Agent, or Firm* — Thomas, Kayden, Horstemeyer & Risley, LLP

(57) ABSTRACT

A portable computer includes a host, a display portion and a plurality of functional modules. The display portion is pivotally connected with the host and has an accommodation concave space. Each of the functional modules has the same connecting structure to be engaged within the accommodation concave space. Either one of the functional modules is installed within the accommodation concave space.

10 Claims, 3 Drawing Sheets

PORTABLE COMPUTER

RELATED APPLICATIONS

This application claims priority to Taiwan Application Serial Number 97130687, filed Aug. 12, 2008, which are herein incorporated by reference.

BACKGROUND

1. Field of Invention

The present invention relates to an electronic device. More particularly, the present invention relates to a portable computer.

2. Description of Related Art

Notebook computers, palm-size computers or other portable computers are very popular in recent computer market such that more and more functional modules are added to portable computers. However, the portable computers are supposed to be thin and light while adding more functional modules would unavoidably increase either the portable computer's size or weight. How the portable computer being equipped with more functionalities but not increased in size and weight needs more efforts contributed by the computer suppliers.

SUMMARY

It is therefore an objective of the present invention to provide a portable computer equipped with a detachable functional module.

In accordance with the foregoing and other objectives of the present invention, a portable computer includes a host, a display portion and a plurality of functional modules. The display portion is pivotally connected with the host and has an accommodation concave space. Each of the functional modules has the same connecting structure to be engaged within the accommodation concave space. Either one of the functional modules is installed within the accommodation concave space.

Thus, the present invention can selectively install either one of several different functional modules into the portable computer to further expand functionalities thereof and not necessarily expand the portable computer's size.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
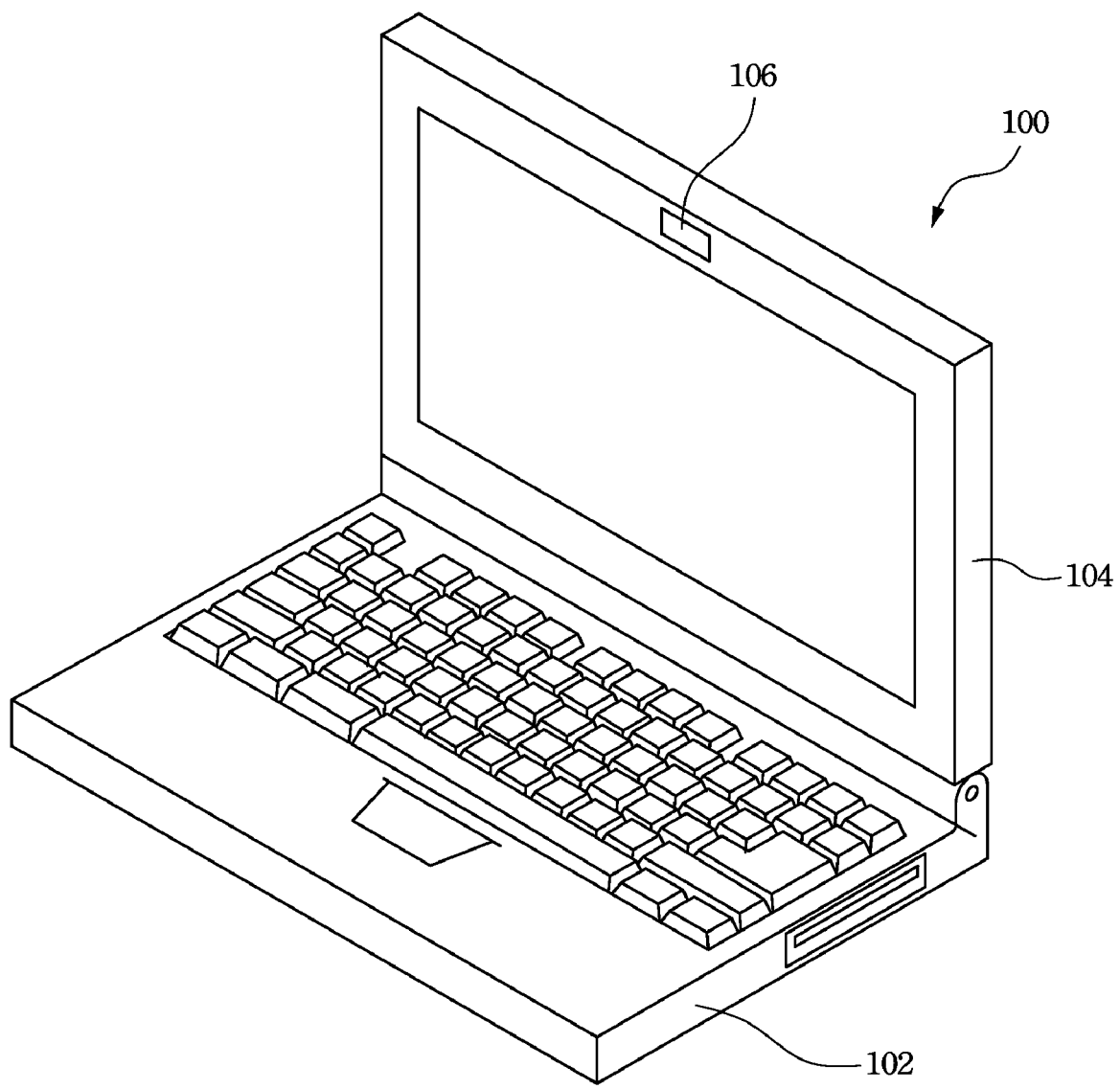
FIG. 1 illustrates a perspective view of a portable computer according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a functional module to integrate a camera module, a projection module and etc. into a portable computer. Specifically, the camera module, the projection module or other functional modules share a common connecting structure, which is used to connect with the portable computer. Either one of the functional modules can be installed on the portable computer according to a user's needs and can be replaced by another functional module while another function is needed. Therefore, the portable computer is equipped with single one desired function module such that it is not necessary to expand the portable computer's size to integrate multiple functional modules. Embodiments below are employed to explain the present invention in details.

FIG. 1 illustrates a perspective view of a portable computer according to one embodiment of this invention. The portable computer 100 includes a host 102, a display portion 104 and several functional modules (FIG. 1 only illustrates single one functional module 106 installed in the display portion 104). The display portion 104 is pivotally connected with the host 102 such that the display portion 104 is rotatable relative to the host 102. In this embodiment, either one of several different functional modules 106 is selectively installed in the display portion 104. How these functional modules 106 being coupled with the display portion 104 is described below.

Figure 2:
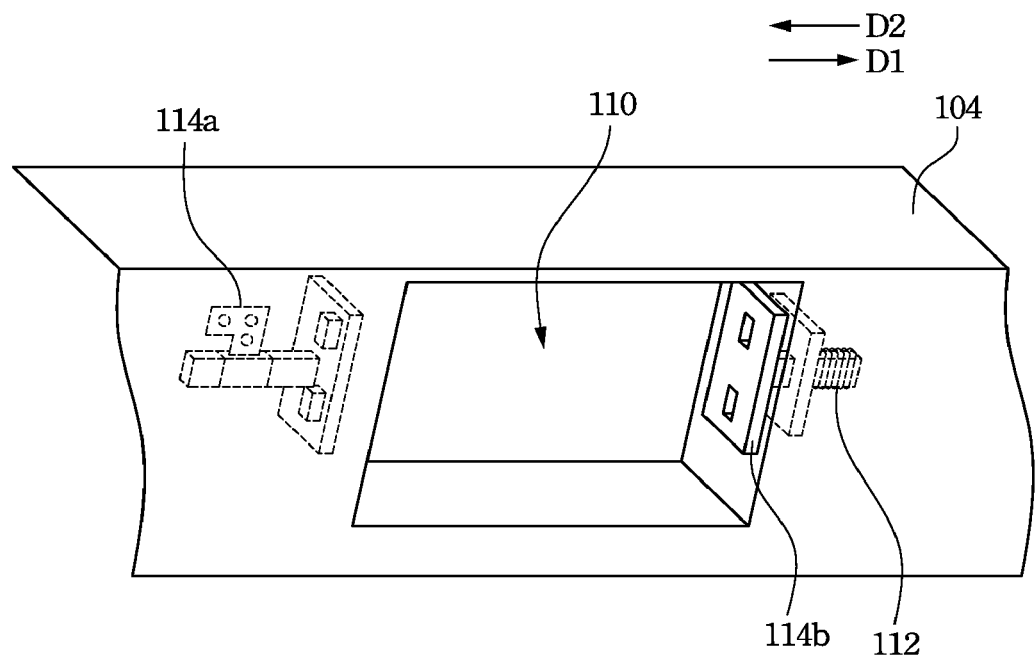
FIG. 2 illustrates a perspective view of a display portion and two different functional modules according to one embodiment of this invention.
Figure 2:
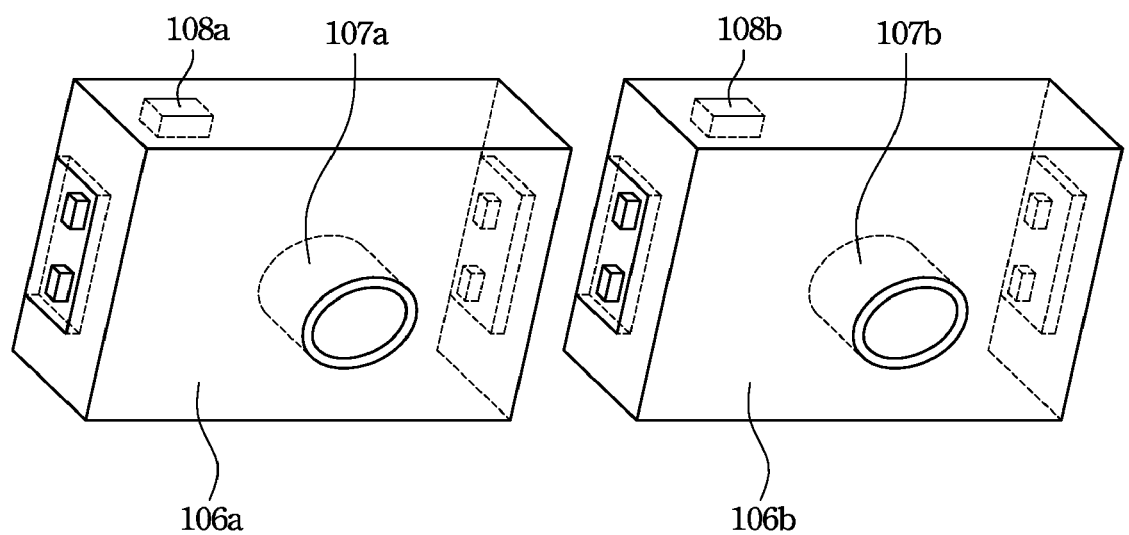

FIG. 2 illustrates a perspective view of a display portion and two different functional modules according to one embodiment of this invention. The display portion 104 has an accommodation concave space 110. A pair of hinges (114a, 114b) are installed on two opposite inner walls of the accommodation concave space 110 in order to couple with different functional modules 106. In this embodiment, exemplary functional modules includes a camera module 106a and a projection module 106b. Each functional module has the same connecting structure to be engaged within the accommodation concave space 110. The connecting structure is further described in the following embodiments.

The camera module 106a has a wireless unit 108a while the projection module 106b has a wireless unit 108b. With this regard, the camera module 106a communicate with the host 102 of the portable computer 100 via the wireless unit 108a while the projection module 106b communicate with the host 102 of the portable computer 100 via the wireless unit 108b. The host 102 can receive image signals from the camera module 106a or transmit image signals to the projection module 106b and then project images onto a screen. In this embodiment, the wireless unit 108b can be blue tooth wireless module or other wireless module. In addition, the camera module 106a may include an image sensor 107a. The image sensor 107a can be a CMOS (Complementary Metal-Oxide-Semiconductor) or CCD (Charge-Coupled Device) image sensor. The projection module 106b can be a liquid-crystal-on-silicon (LCOS) projection device, but still can be other non-LCOS projection module.

Figure 3:
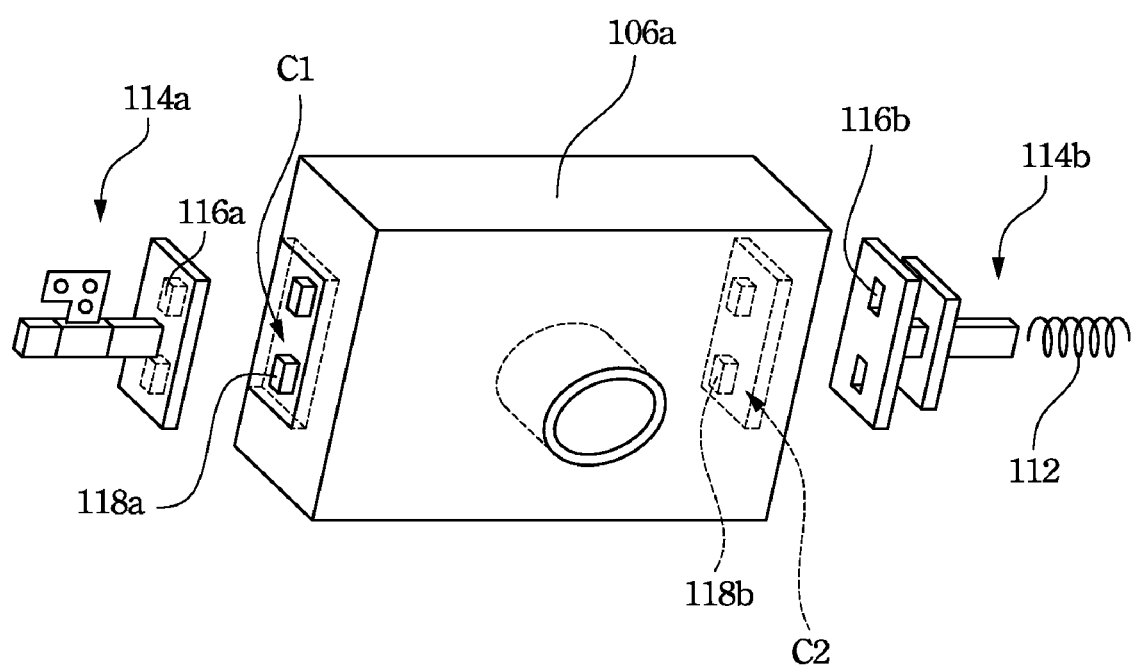
FIG. 3 illustrates a detailed view of a connection mechanism between a camera module and two hinges in FIG. 2.

Referring to both FIG. 2 and FIG. 3, wherein FIG. 3 illustrates a detailed view of a connection mechanism between a camera module and two hinges in FIG. 2. In order to permit the camera module 106a to be detachably connected between two hinges (114a, 114b), the two hinges (114a, 114b) each have respective concave sections (116a, 116b) while the camera module 106a has convex members (118a, 118b) on two opposite ends. In this embodiment, the convex members (118a, 118b) are respectively located within concave areas (C1 and C2) on two opposite ends of the camera module 106a.

The convex members (118a, 118b) are the common connecting structure for different functional modules. The convex members (118a, 118b) are exemplary common connecting structures, and other connecting structures may be utilized for coupling the camera module 106a or the projection module 106b to the portable computer 100.

Moreover, the hinge 114b may include a compression spring 112. When the camera module 106a or the projection module 106b is installed within the accommodation concave space 110, the hinge 114b is moved along a first direction D1 to permit the camera module 106a to be inserted into the accommodation concave space 110, and the convex members 118a of the camera module 106a engages the concave sections 116a of the hinge 114a. The compression spring 112 provides a resilient force to drive the hinge 114b along a second direction D2 (opposite to the first direction D1) such that the convex members 118b of the camera module 106a engages the concave sections 116b of the hinge 114b. Thus, the camera module 106a would be firmly secured within the accommodation concave space 110.

Similarly, the projection module 106b or other functional modules may be secured within the accommodation concave space 110 by the same way as the above-mentioned mechanism used in camera module 106a.

On the other hand, the hinges (114a, 114b) provide a rotation function to the functional modules such that the camera module 106a or the projection module 106b can be adjusted to a desired direction according to a user's demand.

Although exemplary embodiments only includes the camera module 106a and the projection module 106b, persons skilled in the art can implement other functional module to expand more functional options for the portable computer 100.

In sum, users can selectively installed the camera module, the projection module or other functional modules onto the portable computer according to their needs to expand the portable computer's functionalities. Furthermore, it is not necessary to expand the portable computer's size to integrate multiple functional modules because those functional modules share a common connecting structure to connect with the portable computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable computer, comprising:
   a host;
   a display portion being pivotally connected with the host and having an accommodation concave space; and
   a plurality of functional modules each having the same connecting structure to be engaged within the accommodation concave space, either one of the functional modules being installed within the accommodation concave space.

2. The portable computer of claim 1, wherein at least one of the functional modules is a camera module or an image projection module.

3. The portable computer of claim 2, wherein the camera module and image projection module both have a wireless unit to communicate with the host.

4. The portable computer of claim 3, wherein the wireless unit is a blue tooth wireless module.

5. The portable computer of claim 2, wherein the camera module comprises a CMOS sensor or a CCD sensor.

6. The portable computer of claim 2, wherein the image projection module is a liquid-crystal-on-silicon (LCOS) projection device.

7. The portable computer of claim 1, further comprising a pair of hinges disposed within the accommodation concave space to pivotally connected with at least one of the functional modules.

8. The portable computer of claim 7, wherein one of the pair of hinges comprises a spring.

9. The portable computer of claim 7, wherein each of the pair of hinges comprises a concave section, the connecting structure is a convex member, each functional module has the convex members on two opposite ends thereof.

10. The portable computer of claim 9, wherein each functional module has two concave areas on two opposite ends thereof, the convex member is disposed within each of the concave areas.

* * * * *